(12) United States Patent
Tian

(10) Patent No.: US 9,025,236 B2
(45) Date of Patent: May 5, 2015

(54) ELECTROPHORETIC DISPLAY DEVICE

(71) Applicant: BOE Technology Group Co., Ltd., Beijing (CN)

(72) Inventor: Xiaoxiong Tian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 13/703,523

(22) PCT Filed: Oct. 8, 2012

(86) PCT No.: PCT/CN2012/082589
§ 371 (c)(1),
(2) Date: Dec. 11, 2012

(87) PCT Pub. No.: WO2013/056621
PCT Pub. Date: Apr. 25, 2013

(65) Prior Publication Data
US 2014/0078574 A1    Mar. 20, 2014

(30) Foreign Application Priority Data
Oct. 20, 2011 (CN) .................. 2011 2 0402922 U

(51) Int. Cl.
G02B 26/00 (2006.01)
G02F 1/167 (2006.01)
G02F 1/17 (2006.01)
G02B 26/02 (2006.01)

(52) U.S. Cl.
CPC ...... *G02F 1/167* (2013.01); *G02F 1/17* (2013.01); *G02B 26/026* (2013.01)

(58) Field of Classification Search
USPC .................................................. 359/290–297
See application file for complete search history.

(56) References Cited

U.S. PATENT DOCUMENTS

| 4,261,653 | A | 4/1981 | Goodrich |
| 5,922,268 | A | 7/1999 | Sheridon |
| 6,456,272 | B1 | 9/2002 | Howard et al. |
| 2002/0085263 | A1* | 7/2002 | Sheridon .............. 359/296 |

FOREIGN PATENT DOCUMENTS

| CN | 202256977 A | 7/1999 |
| EP | 1220009 A2 | 7/2002 |

OTHER PUBLICATIONS

International Search Report mailed Jan. 7, 2013: PCT/CN2012/082589.
International Preliminary Report on Patentability dated Apr. 22, 2014; PCT/CN2012/082589.

\* cited by examiner

Primary Examiner — Mahidere Sahle
(74) Attorney, Agent, or Firm — Ladas & Parry LLP

(57) ABSTRACT

An embodiment of the present invention provides an electrophoretic display device, comprising: a first substrate and a second substrate, wherein electrophoretic liquid is filled between the first substrate and the second substrate; at an inner surface of the second substrate, there are formed with a plurality of cavities, each of the cavities accommodating one full-color display ball therein; at least two magnetic elements are disposed on the inner surface of the cavity, and one magnetic element is disposed at each of two poles of the full-color display ball. The electrophoretic display device provided by the embodiment of the present invention can achieve better color display.

10 Claims, 5 Drawing Sheets

ELECTROPHORETIC DISPLAY DEVICE

TECHNICAL FIELD

The present invention relates to an electrophoretic display device.

BACKGROUND

An electrophoretic display device belongs to a reflective-type display device, with good sunlight readability, and also with advantages of plain paper and an electronic display. Because the electrophoretic display technology has advantages such as bistability, low power consumption, low costs and tremendous potential for achieving flexible display, it is the best technology for realizing industrialization of electronic paper (e-paper).

At present, implementations of the electrophoretic display technology may have the following ways. Titanium dioxide particles of approximate 1 mm in diameter are dispersed in hydrocarbon oil, and black dye is also added to the hydrocarbon oil, along with surfactants and charge-control agents that cause the white titanium dioxide particles to carry electric charges; this mixture is placed between two parallel, conductive plates that are separated by a gap of 10-100 mm, and when a voltage is applied across the two conductive plates, the charged titanium dioxide particles will migrate electrophoretically to the conductive plate bearing the opposite electric charges. When the titanium dioxide particles are located at the front side (display surface) of the display, the display screen appears white, this is because light is reflected back to a viewer by the titanium dioxide particles; when the particles are located at the rear side of the display, the display appears black, this is because the incident light is absorbed by the black dye. If the electrode on the rear side of the display is divided into a plurality of micro image elements (pixels), then an image can be formed by applying an appropriate voltage to each region of the display to create a pattern of reflecting and absorbing regions.

Gyricon (rotating balls) is another excellent electrophoretic display method, but it possesses shortcomings of small rotation angles and slow rotation speeds, etc., and therefore it is difficult to achieve a rich-color image display and fast image switching.

SUMMARY

Embodiments of the present invention provide an electrophoretic display device for improving color switching speeds of a gyricon display device and achieving rich color display.

An embodiment of the present invention provides an electrophoretic display device, comprising: a first substrate and a second substrate, with electrophoretic liquid filled between the first substrate and the second substrate; at an inner surface of the second substrate, there are formed with a plurality of cavities, each of the cavities accommodating one full-color display ball therein; at least two magnetic elements are disposed on the inner surface of the cavity, and one magnetic element is disposed at each of two poles of the full-color display ball.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical solutions and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

During implementations of the electrophoretic display technology, the inventors have found that at least the following problems are present in the prior art: color switching speed is slow due to the slow response speed of the titanium dioxide particles or the rotating balls in an existing electrophoretic display, as well as such a shortcoming that it is hard for rotating balls to achieve rich-color display due to small rotation angles. To this end, the inventors propose new technical solutions as follows.

First Embodiment

Figure 1:
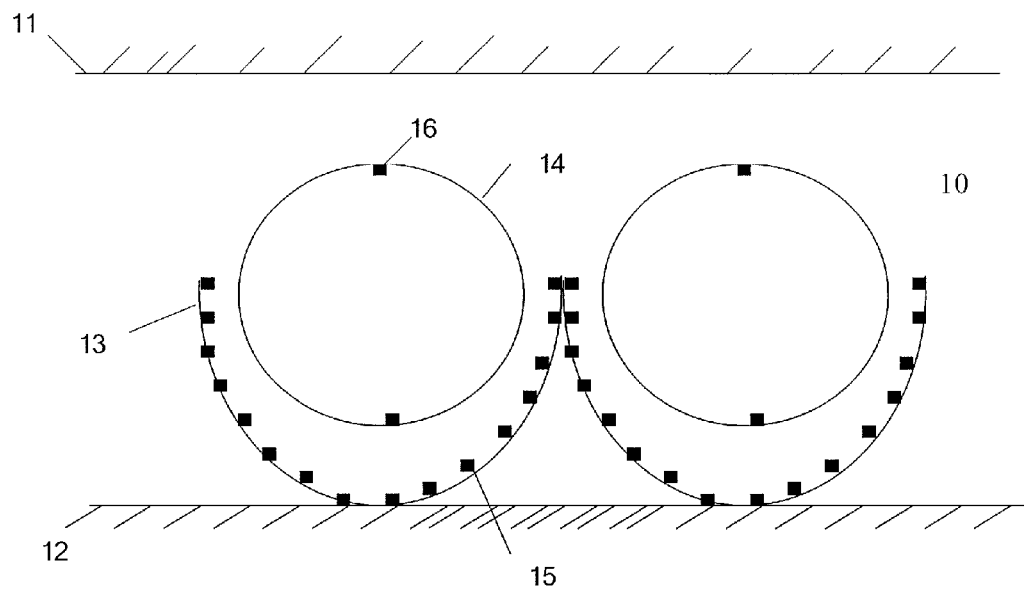
FIG. 1 is a structural view of an electrophoretic display device according to a first embodiment of the present invention.

With reference to FIG. 1, it is shown a structural view of an electrophoretic display device provided by the first embodiment of the present invention. The electrophoretic display device comprises a first substrate 11 and a second substrate 12, with electrophoretic liquid 10 filled between the first substrate 11 and the second substrate 12; at an inner surface of the second substrate 12, there are formed with a plurality of cavities 13 (only two are shown in the figure as an example), each of the cavities 13 accommodating one full-color display ball 14 therein; at least two magnetic elements 15 are disposed on the inner surface of the cavity 13, and one magnetic element 16 is disposed at each of the two poles of the full-color display ball 14. The first substrate 11 is a transparent substrate, which serves as a display side of the display device.

In this embodiment, the first substrate 11 and the second substrate 12 may be, but not limited to, a glass substrate or a quartz substrate; the magnetic elements 16 disposed at the two poles of the full-color display ball 14 may be two magnetic elements having the same polarity.

In the electrophoretic display device provided by the embodiment of the present invention, since magnetic elements 16 are disposed at the two poles of the full-color display ball 14, and at least two magnetic elements 15 are disposed in the cavity 13 on the second substrate 12. Therefore, when a magnetic field is produced by the magnetic elements 15 in the cavity 13 on the second substrate 12, the magnetic elements 16 on the full-color display balls 14 in that magnetic field are affected by the force generated from the magnetic field, which will cause the full-color display balls to rotate immediately to display the corresponding color; thus, by increasing the intensity of the magnetic field, the rotation speeds of the full-color display balls 14 can be improved, and thereby the color switching speed is improved.

In addition, since the magnetic elements 15 in the cavities 13 can control the full-color display balls 14, so that the balls are enabled to rotate at any angles, and thereby the display of any color on the full-color display balls 14 can be achieved.

In this embodiment, the at least two magnetic elements 15 disposed in the hemispherical cavity 13 may be electromagnetic elements. The magnetic elements 16, for example, are tiny magnetic blocks made of permanent magnetic materials (such as rare-earth a permanent magnetic material, a metallic permanent magnetic material, or a ferrite permanent magnetic material). The second substrate 12 is connected with an external power supply to provide voltages to the electromagnetic elements 15, for controlling the rotation speeds and angles of the full-color display balls 14. Specifically, when a voltage is applied to the second substrate 12, the magnetic elements 15 on the second substrate 12 produces a magnetic field; the full-color display balls 14 are affected by the force of the magnetic field and are caused to rotate to display colors. The rotational torque applied by the magnetic force to the magnetic elements 16 of the full-color display balls 14 controls the rotation speed and direction of the full-color display ball 14.

The magnetism of the magnetic elements 16 disposed at the two poles (the end exposed outside) may be the same or not; typically, one is an N pole, the other is an S pole. The magnetism and intensity of the electromagnetic elements 15 for controlling the magnetic elements 16 can be controlled with the voltages, and therefore it is not necessary to specify the magnetism of the magnetic elements 16, and any can realize the control effect.

Second Embodiment

In this embodiment, furthermore, the technical schemes of the present invention are introduced. With reference to FIG. 1, it is shown a structural view of an electrophoretic display device provided by the second embodiment of the present invention.

The electrophoretic display device comprises a first substrate 11 and a second substrate 12, with electrophoretic liquid 10 filled between the first substrate 11 and the second substrate 12; at an inner surface of the second substrate 12, there are formed with a plurality of cavities 13, each of the cavities 13 accommodating one full-color display ball 14 therein; at least two magnetic elements 15 are disposed on the inner surface of the cavity 13, and one magnetic element 16 is disposed at each of the two poles of the full-color display ball 14.

Likewise, in this embodiment, the at least two magnetic elements 15 disposed in the hemispherical cavity 13 may be electromagnetic elements, and the magnetic elements 16 for example are tiny magnetic blocks made of a permanent magnetic material.

In the above device, the magnetic elements 16 are disposed in an embedded form at the two poles of the full-color display ball. The above-described full-color display balls 14 embedded with magnetic elements 16 may be obtained in the following ways.

Figure 2:
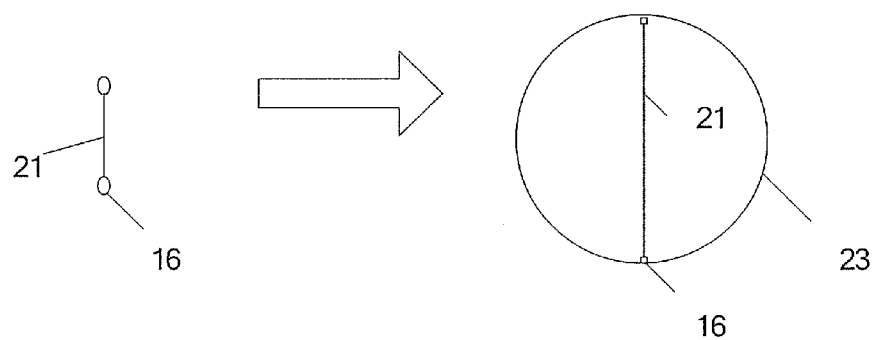
FIG. 2 is a formation diagram of a full-color display ball embedded with magnetic elements, from magnetic elements to a tiny ball, according to a second embodiment of the present invention.

As shown in FIG. 2, one way is to provide a slender tiny rod 21 of polymer or some other non-magnetic material, two ends of which are two magnetic elements 16, and then, by taking it as a diameter, produce a tiny ball 23, and the tiny ball 23 is the full-color ball 14 shown in FIG. 1.

Figure 3:
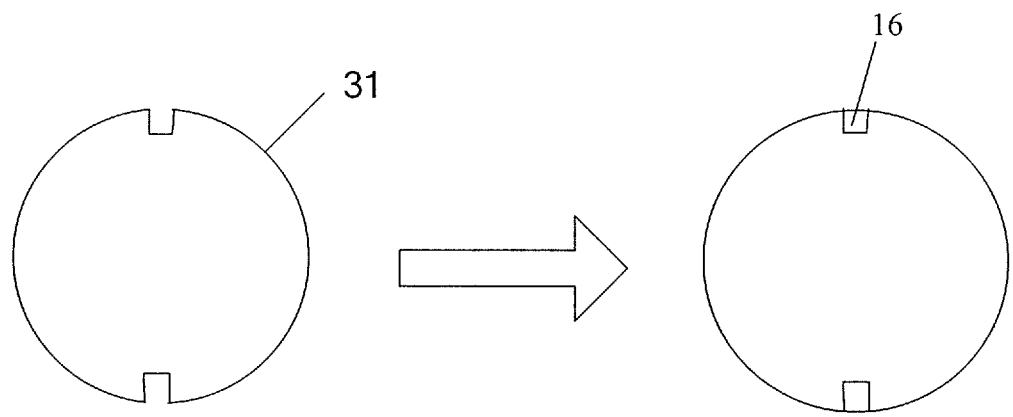
FIG. 3 is a formation diagram of a full-color display ball embedded with magnetic elements, from a tiny ball to magnetic elements, according to the second embodiment of the present invention.

As shown in FIG. 3, another way is to first manufacture a main body 31 of a full-color display ball in a spherical structure, with the two poles of the main body 31 of the full-color display ball each being formed with one recess respectively, and then fill the magnetic elements 16 into the recesses at the two poles of the main body of the full-color display ball, thereby forming the full-color display ball 14 as shown in FIG. 1. The main body 31 of the full-color display ball is made of a non-magnetic material, such as an organic material.

In addition, the inner surface of the cavity 13 may be of a spherical cap-shaped surface; and a diametral plane of the full-color display ball 14 may be flush with an upper section of the cavity 13, thus the rotation of the full-color display ball 14 in all orientations and angles can be achieved. Since the average density of the full-color display ball 14 may be consistent or substantially consistent with the average density of the electrophoretic liquid 10, the full-color display balls 14 may suspend in the electrophoretic liquid 10, which in turn easily enable a diametral plane of the full-color display ball 14 to be flush with an upper section of the cavity 13.

Usually, the at least two magnetic elements 15 are uniformly distributed at the inner surface of the cavity 13.

However, it is not exclusive that other reasonable distributions may be presented in practice. Besides the uniform distribution of the at least two magnetic elements 15 at the inner surface of the cavity 13, the reasonable distributions are practically presented in the following two situations. When the desired rotation speed and rotation angle of the full-color display ball 14 is determined, it should be ensured that the distribution thereof is provided so that minimum number of magnetic elements are used for cost saving; when the number of the available magnetic elements is determined, it should be ensured that the distribution is provided so that, under a same voltage, the force generated by the magnetic elements enable the full-color display balls to rotate at the fastest rotation speed and in the largest rotation angle range.

The full-color display balls 14 may be rotating balls, surfaces of which are formed with a full-color scheme. If a connecting line between the two poles of the full-color display ball 14 is taken as a longitude line of the full-color display ball 14, and a line perpendicular to the longitude line is taken as a latitude line of the full-color display ball 14, then the proposals on formation of a full-color scheme include, but not limited to, the following ones.

Figure 4:
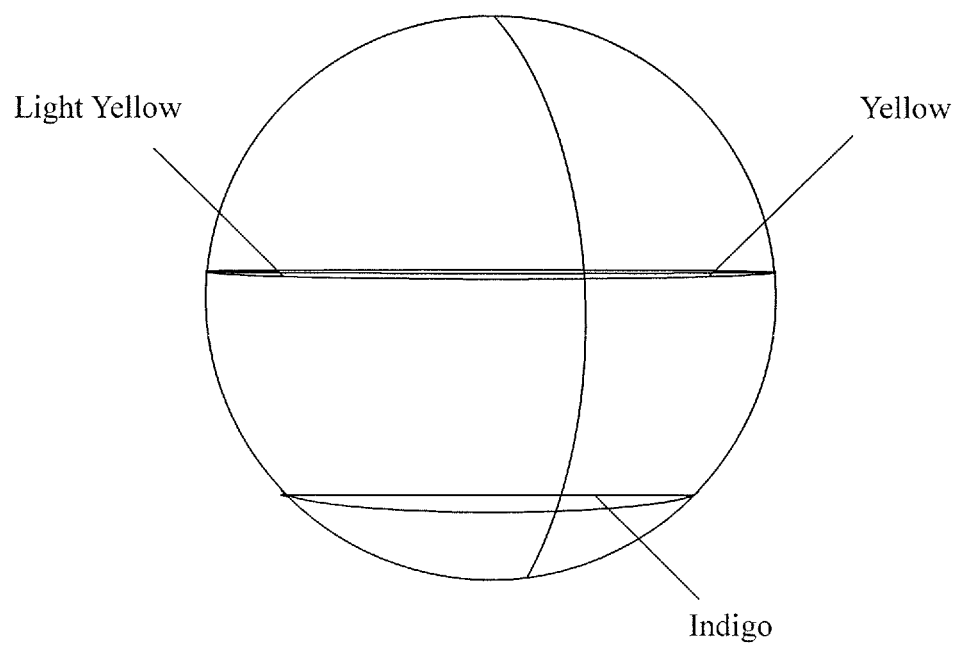
FIG. 4 is a first proposal for formation of a full-color scheme on a surface of a full-color display ball, according to the second embodiment of the present invention.

First, with reference to FIG. 4, the colors in the full-color scheme of the surface of the full-color display ball vary gradually along a longitude direction, and brightness of the same color varies gradually along a latitude direction. Therefore, during the rotation process of the full-color display balls, there occur transitions of red-orange, orange-yellow, yellow-green, green-blue, blue-indigo, indigo-violet, purple-red in accordance with different latitudes, and each color turns from light to dark in accordance with different longitudes.

Figure 5:
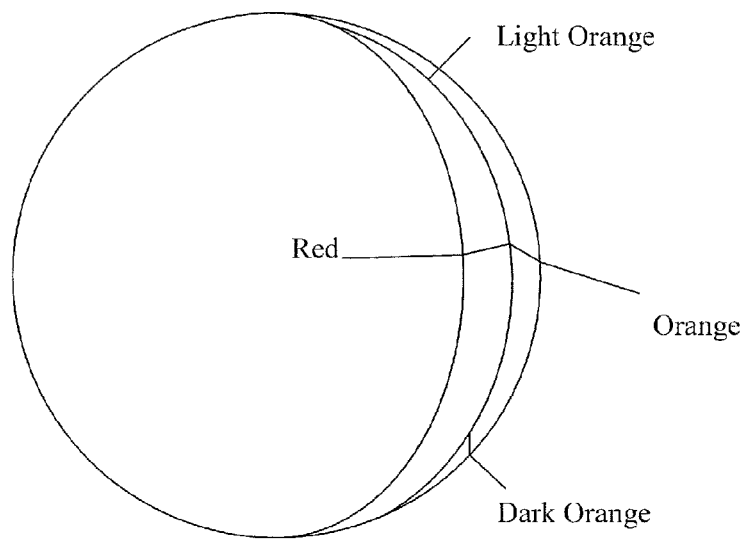
FIG. 5 is a second proposal for formation of a full-color scheme on a surface of a full-color display ball, according to the second embodiment of the present invention.

Second, with reference to FIG. 5, the colors in the full-color scheme of the surface of the full-color display ball vary gradually along a latitude direction, and brightness of the same color varies gradually along a longitude direction. Therefore, during the rotation process of the full-color display balls, there occur transitions of red-orange, orange-yellow, yellow-green, green-blue, blue-indigo, indigo-violet, purple-red in accordance with different longitudes, and each color turns from light to dark in accordance with different latitudes, with the two poles being in white and black respectively.

Figure 6:
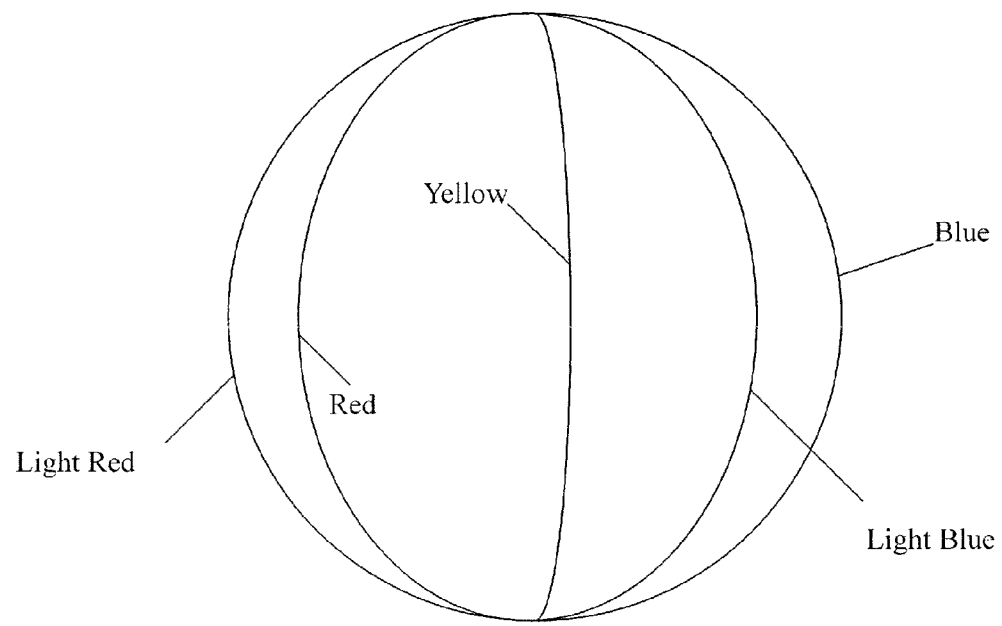
FIG. 6 is a third proposal for formation of a full-color scheme on a surface of a full-color display ball, according to the second embodiment of the present invention.

Third, with reference to FIG. 6, the colors in the full-color scheme of the surface of the full-color display ball are uniformly distributed within a plurality of regions defined by longitude lines. On the full-color display balls, there occur transitions of various colors in accordance with different longitudes, but colors at the same longitude are exactly the same and do not change in accordance with different latitudes. Since the transitions are gradual, therefore the same color in light or dark can be attained, that is, full-color can be attained, without the need to make changes from light to dark in latitudes. Here, the two poles are only in white, while the black may be displayed by controlling the full-color display balls to fall down to the deep of the electrophoretic liquid so that the electrophoretic liquid absorbs the light and attain the display of black.

Fourth, the colors in the full-color scheme of the surface of the full-color display ball are uniformly distributed within a plurality of regions defined by longitude lines and latitude lines.

Figure 7:
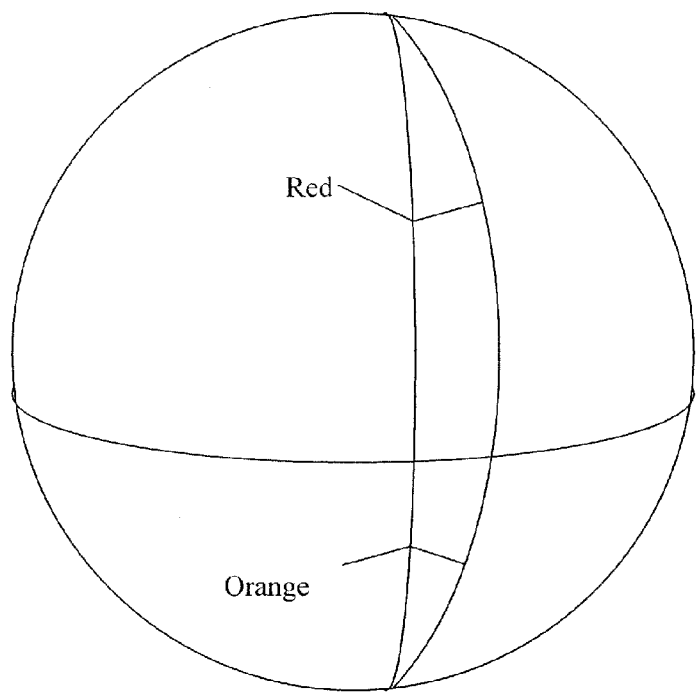
FIG. 7 is a schematic view of a distribution of a color scheme to be provided on a surface of a full-color display ball, comprising the color schemes in which the number of the color categories n is an even number.
Figure 8:
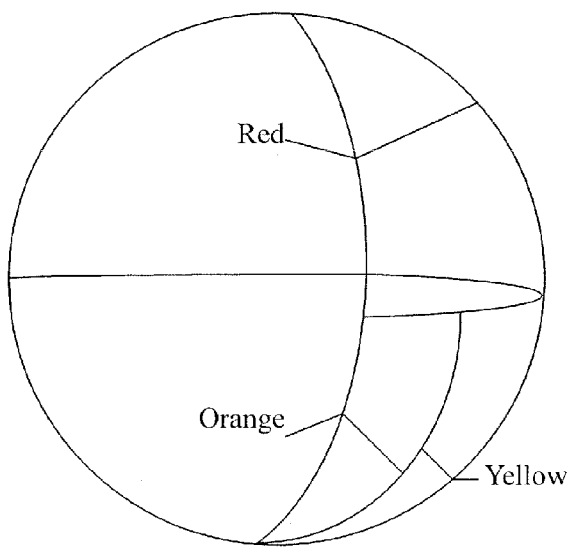
FIG. 8 is a schematic view of a distribution of a color scheme to be provided on a surface of a full-color display ball, comprising the color schemes in which the number of the color categories n is an odd number.

For example, the color scheme to be provided comprises n categories of colors, which includes the following two situations:

1. With reference to FIG.7, n is an even number, then the upper and lower hemispheres of the full-color display ball comprise n/2 categories of colors respectively, and in each hemisphere, the region occupied by each color is a sector-region with a central angle $2*\pi/(n/2)$;

2. With reference to FIG. 8, n is an odd number, then the upper and lower hemispheres of the full-color display ball comprise $(n+1)/2$, $(n-1)/2$ categories of colors respectively, and in each hemisphere, the region occupied by each color is a sector-region with a central angle $2*\pi/[(n+1)/2]$, $2*\pi/[(n-1)/2]$. Certainly, in this situation, the upper and the lower are equivalent and can be interchanged.

When the voltage applied across the substrates for controlling the rotation of the full-color display ball is varied, the magnetic elements on the full-color display balls acting as electrophoretic particles are affected by the force generated from the magnetic field produced by the magnetic elements on the cavities, so that the full-color display balls start to rotate, and since the full-color display balls are in a full-color scheme, vivid color display can be achieved. Generally, for specific implementations, there exist the following methods.

The first method comprises: presetting the rotation angles needed for rotating from black or white to another color; upon receiving the information about the color to be displayed, firstly determining the current color, next calculating the rotation angle needed for rotating from the current color to the color to be displayed; according to that angle, calculating the value and direction of the voltage needed to be applied; then, according to the calculation results, applying the voltage to the substrates from an external power supply. For example, coordinates for white, red and orange are set to 0°, 30° and 60°, respectively. Thus, when orange needs to be displayed, firstly, the current color is determined: if the current color is white, then the calculation result is rotation of 60°, and thus the value and direction of the voltage needed to be applied are calculated; if the current color is red, then the calculation result is rotation of 30°, and thus the value and direction of the voltage needed to be applied are calculated. In other cases, it can be done in the same manner.

The second method includes: presetting the rotation angles needed for rotating from black or white to another color; upon receiving the information about the color to be displayed, firstly resetting, and then rotating to the color required. In this way, the location of the path for each color is fixed, thus there is no need to determine the current color.

The third method includes: presetting the rotation angles needed for rotating from black or white to another color, and establishing a record every time of color switching. Upon receiving again information about the color to be displayed, according to the established records and calculation, the next rotation angle required can be obtained.

Figure 9:
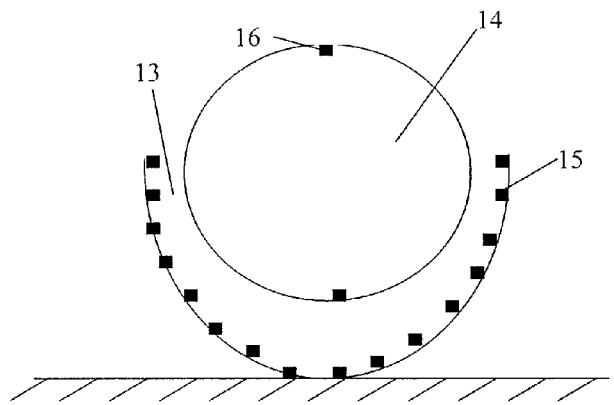
FIG. 9 is a schematic view of the second embodiment of the present invention, showing the contact area between the cavity and the second substrate has only a polar point at the bottom of the cavity.
Figure 10:
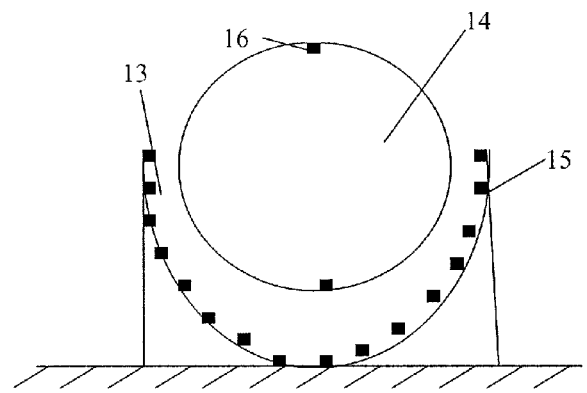
FIG. 10 is a schematic view of the second embodiment of the present invention, showing the contact area between the cavity and the second substrate equals to an upper section area of the cavity.
Figure 11:
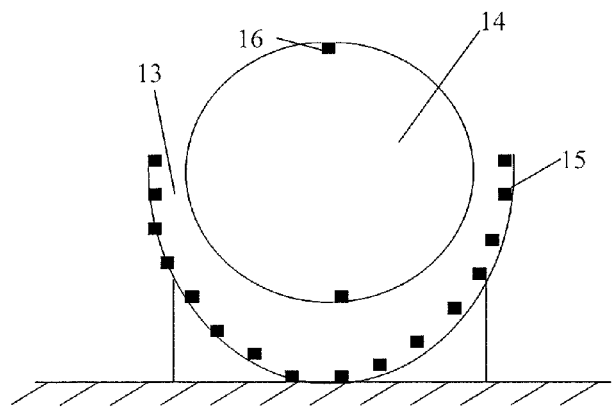
FIG. 11 is a schematic view of the second embodiment of the present invention, showing the contact area between the cavity and the second substrate is between the areas shown respectively in FIG. 9 and FIG. 10.

As shown in FIG. 9, FIG. 10 and FIG. 11, the contact area between the cavity and the second substrate is less than or equal to an upper section area of the cavity. FIG. 9 is a schematic view showing the contact area between the cavity and the second substrate has only a polar point at the bottom of the cavity; FIG. 10 is a schematic view showing the contact area between the cavity and the second substrate equals to an upper section area of the cavity, in which the region between the two vertical lines represents the contact area; and FIG. 11 is a schematic view showing the contact area between the cavity and the second substrate is between the areas shown respectively in FIG. 9 and FIG. 10, in which, like FIG. 10, the region between the two vertical lines represents the contact area. The commonly used value of the contact area is 1/9-4/9 of the upper section area. Such value is obtained by the following formula: since the diameter of the commonly used contact area is 1/3-2/3 of the diameter of the upper section area, thus the above conclusion can be obtained according to the power relationship between scales of diameter and area. Certainly, in practice, it can be done as long as the following principle as below is followed: if stability and unaffectedness of operation of the magnetic elements on the inner surfaces of the hemispherical cavities are ensured, the contact area should be as small as possible.

In the electrophoretic display device provided by the embodiments of the present invention, since magnetic elements are disposed at two poles of the full-color display balls, and at least two magnetic elements are disposed on the inner surface of the cavity, when a magnetic field is produced by the magnetic elements in the cavity on the second substrate, the magnetic elements on the full-color display balls in that magnetic field are affected by the force generated from the magnetic field, which will cause the full-color display balls to rotate immediately to display the corresponding color; by increasing the intensity of the magnetic field, the rotation speeds of the full-color display balls can be improved, and thereby the color switching speed is improved.

In addition, since the magnetic elements in the cavities can control the full-color display balls, so that the balls are enabled to rotate at any angles, and thereby the display of any color on the full-color display balls are achieved.

The embodiments of the present invention are mainly suitable for fields where displays are needed, such as electronic paper, personal computers, etc.

The above description is just the specific implementation of the present invention, and the scope of protection of the present invention is not limited thereto. Within the technical scope disclosed by the present invention, any modifications or alterations that are easily devised by those skilled who are familiar with the technology, should be encompassed by the scope of protection of the present invention. Therefore, the scope of protection of the invention should be defined by the scope of protection of the claims.

The invention claimed is:

1. An electrophoretic display device, comprising:
    a first substrate and a second substrate, with electrophoretic liquid filled between the first substrate and the second substrate;
    wherein at an inner surface of the second substrate, there are formed with a plurality of cavities, each of the cavities accommodating one full-color display ball therein; and
    wherein at least two first magnetic elements are disposed on the inner surface of the cavity, and one second magnetic element is disposed at each of two poles of the full-color display ball.

2. The electrophoretic display device according to claim 1, wherein the second magnetic elements are disposed in an embedded form at the two poles of the full-color display ball.

3. The electrophoretic display device according to claim 1, wherein the inner surface of the cavity is of a spherical cap-shaped surface; and a diametral plane of the full-color display ball is flush with an upper section of the cavity.

4. The electrophoretic display device according to claim 1, wherein the at least first two magnetic elements are uniformly distributed at the inner surface of the cavity.

5. The electrophoretic display device according to claim 1, wherein average density of the full-color display ball is consistent with density of the electrophoretic liquid.

6. The electrophoretic display device according to claim 1, wherein the full-color display balls are rotating balls surfaces of which are formed with a full-color scheme.

7. The electrophoretic display device according to claim 6, wherein a connecting line between the two poles of the full-color display ball is taken as a longitude line of the full-color display ball, and a line perpendicular to the longitude is taken as a latitude line of the full-color display ball; and colors in the full-color scheme of the surface of the full-color display ball vary gradually along a longitude direction, and brightness of a same color varies gradually along a latitude direction; or, colors in the full-color scheme of the surface of the full-color display ball vary gradually along a latitude direction, and brightness of a same color varies gradually along a longitude direction; or, colors in the full-color scheme of the surface of the full-color display ball is uniformly distributed within a plurality of regions defined by longitude lines or by longitude lines and latitude lines.

8. The electrophoretic display device according to claim 1, wherein a contact area between the cavity and the second substrate is less than or equal to an upper section area of the cavity.

9. The electrophoretic display device according to claim 1, wherein the at least two first magnetic elements are electromagnetic elements;
    the second substrate is connected with an external power supply, for providing voltages to the electromagnetic elements, so as to control rotation speeds and angles of the full-color display balls.

10. The electrophoretic display device according to claim 1, wherein the first substrate is on a display side of the electrophoretic display device.

* * * * *